H. C. Ingraham.

Excavator.

No. 2,795. Reissued Nov. 5, 1867.

Witnesses:

Wm. Van Camp
T. T. Kneeland

Inventor:

Henry C. Ingraham.

N. PETERS, PHOTO-LITHOGRAPHER, WASHINGTON, D. C.

United States Patent Office.

HENRY C. INGRAHAM, OF TECUMSEH, MICHIGAN.

*Letters Patent No.* 59,028, *dated October* 23, 1866; *reissue No.* 2,795, *dated November* 5, 1867.

IMPROVEMENT IN DITCHING MACHINE.

The Schedule referred to in these Letters Patent and making part of the same.

Be it known that I, HENRY C. INGRAHAM, of Tecumseh, in the county of Lenawee, and State of Michigan, have invented a new and useful Machine for Digging Ditches; and I do hereby declare that the following is a full and exact description thereof, reference being had to the accompanying drawings and to the letters of reference marked thereon.

Like letters indicate like parts in all the figures.

The novelty of my invention consists, first, in the arrangement of a double mould-board plough and two single mould-board ploughs, by means of which the earth is broken up from the line of the ditch and thrown upon a belt, which passes over a pulley lying between the sides of the double mould-board plough and around the elevating-wheel A; second, in the method of elevating the dirt thrown up by the ploughs or by means of a bolt, Q, and an elevating-wheel, A, the dirt being confined to the perimeter of the wheel, as it revolves, by the belt Q, and the projecting flanges *a a'* of the wheel; third, in the form and arrangement of a plough-shaped scoop or chute, F, over which the dirt is forced from the top of the wheel, by the action of the wheel A and belt Q and falls to the side of the line of the ditch; fourth, in the arrangement of the several parts of the mechanism hereinafter set forth and claimed as new.

To enable those skilled in the art to make and use my invention, I will proceed to describe its construction and operation.

Figure 1:
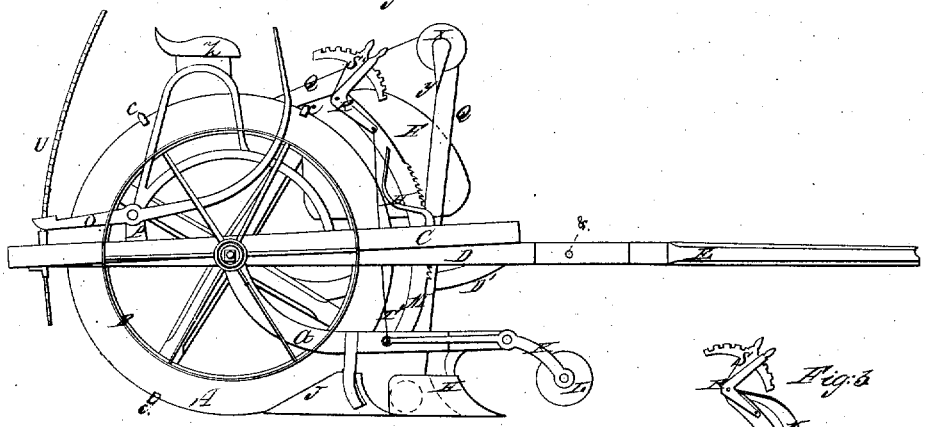
Figure 1 is a side elevation of my invention.
Figure 3:
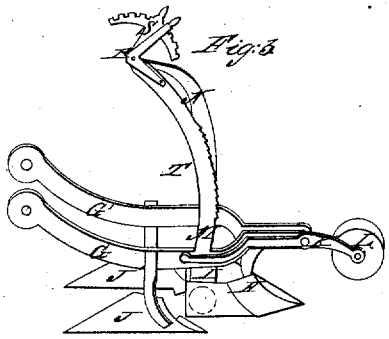
Figure 3 is a perspective view of the ploughs and their attachments.
Figure 2:
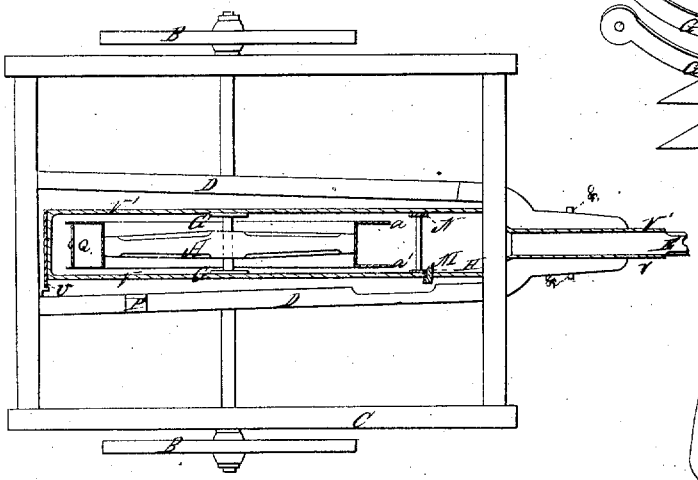
Figure 2 is a plan of the carriage and section of elevating-wheel A.
Figure 4:
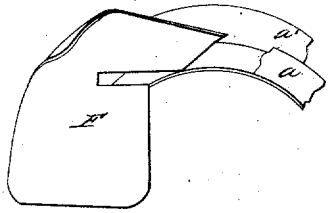
Figure 4 is a view of a portion of the elevating-wheel A, and of the scoop or chute F, showing its relation thereto.

The carriage (which consists of the rectangular frame C, longitudinal bars D D', the wheels B B, and their axles) is attached to the tongue E by means of the bolt *f*. The object of the carriage is to facilitate transportation and the raising of the ploughs and elevating-wheel for the purpose of turning around, passing over an obstruction, &c. The axle of the elevating-wheel A has its bearings in a frame, which may be made of iron, *v v*, tinted with blue in fig. 2, the sides of which, *v v*, are brought toward each other in front of the wheel A, and are fastened rigidly to the sides of the tongue E. The wheel A has two projecting flanges from the rim, (marked *a a'*, fig. 2,) which, with the rim, form a rectangular channel about the wheel. G G' are sides of a bifurcated frame, to which H J J' are attached. The bars G G' of the frame are curved upward, and have holes at their upper extremities, through which passes the axle of the wheel A; thus the bifurcated frame, the ploughs, and their attachments, are pivoted on the axle of the wheel A. As the frame C is pivoted to the tongue by the bolt *f*, the frame resting upon the wheels B, the excavating mechanism attached to the frame V may be allowed to descend into the ditch, while the wheels B run upon the surface of the ground on each side of the ditch. The draught and plough-beams being both connected with and turning on the axis of the wheel A directly, they will continue to bear the same relations to one another at whatever depth the plough may be cutting in the ditch, the frame C maintaining a horizontal position, and the point of the plough being set to make a uniform horizontal cut. H is a double mould-board plough, having vertical parallel sides, between which is a pulley, I. In rear of the plough H, attached by standards from the sides G G of the frame, are two single mould-boards, a right and a left one, so shaped and situated as to throw the earth turned up by the plough H back in the rear of said plough upon a belt, Q, which passes around the pulley I in the plough H and the elevating-wheel A; also, over a tightening-pulley, *x*, which has its bearings in the elastic bar *y*. From the upper edges of the sides G G of the plough-frame are raised two curved segments M N, the centre of their curve being in the axis of the wheel A. A part of the outer edge of segment M is serrated, and a spring-pawl on the frame V meshes between the teeth, supporting the plough-frame and its attachments. The pawl may be thrown out from the teeth by pressing the lever H toward the tongue. The segment N is bent laterally toward the segment M, and fastened. That part of the segment N which is above the bend forms a support for the chute F. The near flange of the wheel A (see fig. 4) is represented as broken away in order to reveal the form of the scoop or chute F. The slot in the chute is for the free passage of the near flange, as represented. That part of the chute beyond the slot is between the flanges *a a'* of the wheel A, and the edge thereof lies close to the rim of the wheel and the further flange. S is a cogged segment, which may be attached to or form a part of segment M. R is a bent lever pivoted at the angle, having a spur or cog, which meshes into the cogs of segment S. From its lower extremity a rod descends to one end of a bent lever, K, which lies along the side of the plough-frame G, conforming in shape thereto, having a wheel, L, at the other end, and having for its fulcrum a bolt through the forward end of the plough-frame. At the back end of the frame V is a curved segment, U, the centre of its curve being the bolt *f*. This segment has a serrated edge, into which a pawl on the carriage-frame C catches. The driver's seat Z is supported by suitable braces from the iron frame V V. The longitudinal bar D′ is curved downward, so as not to interfere with the chute F. There may be small spurs *c c c* on the flanges *a a′* of the elevating-wheel A, to prevent it slipping. O is a curved lever, the edge of which, near the end of the shorter arm, is bent over toward the segment U, and made so as to fit between the teeth thereof. Its fulcrum P is fastened to the bar D of the carriage.

The operation of this machine is as follows: The pawl that meshes into the teeth of the segment U being thrown out of mesh, the wheel A will rest upon the ground. The horses are attached to the tongue E, and the operator takes the seat Z, presses his foot against the lever H, which throws out the pawl from the teeth of the segment M, which allows the ploughs to descend until they reach the ground, adjusts the wheel L by means of the bent lever K, so that the ploughs will cut a suitable furrow, and then drives along the line of the ditch. The furrows thrown from the double mould-board plough H are thrown back upon the belt Q, which lies in the furrow made by the plough H, and into the rectangular channel of the wheel A, where it is confined by the belt Q as the wheel revolves, the tightening-pulley *x* keeping the belt taut. The earth passes over the chute F and falls to the side of the line of the ditch. If the operator wishes to run the plough out of the ground, he will draw the lever R toward him, and by drawing the segment S toward him he will raise the ploughs entirely from the ground, and by working the lever O he may raise the elevating-wheel A. Thus the machine may be made very portable, being supported by the carriage-wheels B B. As the machine takes but a light furrow, it is necessary to pass over the line of the ditch repeatedly until the ditch is sunk to the required depth.

What I claim as new, and desire to secure by Letters Patent, is—

1. The combination of the double-flanged wheel A and belt Q, which, revolving in the same direction, will carry the earth loosened by the plough over the wheel, substantially as set forth.

2. Attaching the draught and also the plough-frame to the axis of the wheel A, substantially as and for the purpose set forth.

3. The combination of the double mould-board plough H and single mould-board J J with the belt Q and double-flanged wheel B, substantially as set forth.

4. Hinging the main frame C to the tongue-irons, substantially in the manner and for the purpose set forth.

5. The arrangement of the double-flanged wheel A and chute F, when the latter is so constructed as to serve also as a scraper for clearing the earth from the wheel, substantially as set forth.

6. The arrangement of the segments M and N, frame V, and lever and catch H, substantially as set forth.

7. The combination of the lever R, rod T, bent arm K, and wheel L, for the purpose of adjusting the depth of the cut of the plough H, substantially as set forth.

8. The combination of the lever O and pawl attached to the frame C and segment U, for raising the wheel A and the other mechanism, substantially as set forth.

9. The combination of the double-flanged wheel A, endless belt Q, tightening-pulley *x*, and pulley I, arranged to operate substantially as set forth.

In testimony whereof I have signed my name to this specification before two subscribing witnesses.

HENRY C. INGRAHAM.

Witnesses:

WM. A. McKENNEY,
J. McKENNEY.